United States Patent [19]

Okazaki et al.

[11] Patent Number: 4,907,786
[45] Date of Patent: Mar. 13, 1990

[54] FLUID-FILLED ELASTIC MOUNT HAVING PARTITION MEMBER WHICH INCLUDES A DOUBLE-LAYERED SECTION

[75] Inventors: Masaaki Okazaki, Inuyama; Itsuro Kadomura, Kasugai, both of Japan

[73] Assignee: Tokai Rubber Industries, Ltd., Japan

[21] Appl. No.: 235,558

[22] Filed: Aug. 24, 1988

[30] Foreign Application Priority Data

Aug. 28, 1987 [JP] Japan .............. 62-132205[U]

[51] Int. Cl.⁴ ............................................. F16F 13/00
[52] U.S. Cl. .............................. 267/140.1; 248/562; 248/636; 267/140.3; 267/219
[58] Field of Search ............... 267/140.1, 140.2, 140.3, 267/140.4, 141, 141.1, 153, 152, 219, 220, 292–294; 180/300, 312, 902; 248/636, 562, 630, 632, 634, 621, 619, 631, 638; 123/192, 195 R; 188/320

[56] References Cited

U.S. PATENT DOCUMENTS

| | | | |
|---|---|---|---|
| 4,568,069 | 2/1986 | Poupard | 267/140.1 |
| 4,588,173 | 5/1986 | Gold et al. | 267/140.1 |
| 4,641,817 | 2/1987 | Clark et al. | 267/140.1 |
| 4,651,980 | 3/1987 | Morita et al. | 267/140.1 |
| 4,673,314 | 6/1987 | Hara et al. | 267/140.3 X |
| 4,709,907 | 12/1987 | Thorn | 267/140.1 |
| 4,720,084 | 1/1988 | Hollerweger et al. | 188/299 X |
| 4,726,573 | 2/1988 | Hamaekers et al. | 267/140.1 |
| 4,765,601 | 8/1988 | Miller et al. | 267/140.1 |

FOREIGN PATENT DOCUMENTS

| | | | |
|---|---|---|---|
| 0042910 | 4/1982 | European Pat. Off. | 248/562 |
| 3019337 | 11/1981 | Fed. Rep. of Germany | |
| 3140783 | 4/1983 | Fed. Rep. of Germany | 267/140.1 |
| 57-009340 | 1/1982 | Japan | |
| 0163746 | 10/1982 | Japan | 248/562 |
| 0018633 | 1/1985 | Japan | 267/140.1 |
| 0113933 | 5/1987 | Japan | 267/140.1 |
| 0127536 | 6/1987 | Japan | 267/140.1 |
| 2165617 | 4/1986 | United Kingdom | 267/140.1 |
| 8601567 | 3/1986 | World Int. Prop. O. | 267/140.1 |

Primary Examiner—Douglas C. Butler
Attorney, Agent, or Firm—Oliff & Berridge

[57] ABSTRACT

A fluid-filled elastic mount having an elastic body which elastically connects a first and a second support member, a closure member which cooperates with the second support member and the elastic body to define a fluid chamber, a partition member which divides the fluid chamber into a pressure-receiving chamber and an equilibrium chamber, and a restrictor passage for restricted fluid communication between the two chambers. The partition member consists of an integrally formed member which has a thin-walled inner portion and a thick-walled outer portion outside of the inner portion. The outer portion has a circumferential groove and is held in pressed contact with the second support member such that the groove is closed so as to define the restrictor passage. The inner portion includes a double-layered structure consisting of a first layer formed of a first elastic material, and a second layer formed of a second elastic material which has a larger modulus of elasticity than the first elastic material. The double-layered structure is elastically deformable due to a difference between pressures in the two chambers.

9 Claims, 2 Drawing Sheets

FLUID-FILLED ELASTIC MOUNT HAVING PARTITION MEMBER WHICH INCLUDES A DOUBLE-LAYERED SECTION

BACKGROUND OF THE INVENTION

1. Field of the Invention

The present invention relates to a fluid-filled elastic mount such as an engine mount for a motor vehicle, and more particularly to improvements in such a fluid-filled elastic mount which is highly capable of damping low-frequency, large-amplitude vibrations, and isolating high-frequency, small-amplitude vibrations.

2. Discussion of the Prior Art

An elastic mounting device such as a mount for elastically mounting an engine on a motor vehicle is generally required to exhibit not only an excellent vibration-damping characteristic for vibrations having a comparatively low frequency and a comparatively large amplitude, but also an excellent vibration-isolating characteristic for vibrations having a comparatively high frequency and a comparatively small amplitude. As an elastic mount which satisfies these two requirements, a so-called fluid-filled elastic mount is proposed according to laid-open Publication No. 57-9340 (published in 1982) of unexamined Japanese patent application corresponding to German patent application No. 3019337.4. This fluid-filled elastic mount has (a) a first and a second support member which are spaced apart from each other by a suitable distance, (b) an elastic body disposed between the first and second support members for elastically connecting these two support members, (c) a closure member which is supported by the second support member and which cooperates with the second support member and the elastic body to define a fluid chamber which is filled with a suitable non-compressible fluid, at least a portion of the closure member being formed of a flexible material, (d) a partition member which is supported by the second support member and which divides the fluid chamber into a pressure-receiving chamber on the side of the elastic body and an equilibrium chamber on the side of the closure member, (e) a restrictor passage formed for restricted fluid communication between the pressure-receiving chamber and the equilibrium chamber, and (f) a movable member which is deformable or displaceable by a suitable amount in a direction so as to absorb a pressure difference between the pressure-receiving and equilibrium chambers.

The fluid-filled elastic mount constructed as described above is capable of effectively damping low-frequency large-amplitude vibrations based on flows of the fluid through the restrictor passage, and at the same time capable of effectively isolating high-frequency small-amplitude vibrations based on deformation or displacement of the movable member. That is, this type of elastic mount has excellent vibration damping and isolating characteristics.

In the known fluid-filled elastic mount constructed as described above, the movable member is generally supported by the partition member which consists of a metallic structure, as disclosed in the above-identified document. This type of partition member is difficult to manufacture and assemble, and the production efficiency of the elastic mount is accordingly low.

It is considered to use an integrally formed partition member made of a suitable elastic material so that a portion of the partition member is deformable in a direction so as to absorb or accommodate a pressure difference between the pressure-receiving and equilibrium chambers, in the fluid-filled elastic mount which has the above-indicated elements: first and second support members; elastic body; closure member; partition member; and means for defining a restrictor passage.

The above modified form of the fluid-filled elastic mount which uses the elastic partition member is capable of effectively isolating high-frequency small-amplitude vibrations based on deformation of the appropriate portion of the partition member so as to absorb the pressure difference. Hence, this elastic mount has substantially the same vibration damping and isolating characteristics as the fluid-filled elastic mount which uses a separate movable member as described above. The integrally formed elastic partition member is easier to produce and assemble, than the partition member which movably supports the movable member. Accordingly, the production efficiency of the elastic mount using the elastic partition member is significantly improved.

Although the elastic mount which uses the elastic partition member enjoys a comparatively high degree of manufacturing efficiency, it is difficult to provide the elastic mount with vibration-damping capability based on resonance of the fluid mass in the restrictor passage, as well as vibration-isolating capability based on deformation of the partition member, in the case where the restrictor passage is defined by a groove formed in the partition member so that the construction of the elastic mount is simplified.

Described more specifically, the integrally formed partition member made of an elastic material is generally secured or fixed at its outer portion to the second support member such that the outer portion is held in pressed contact with the inner surface of the second support member. The outer portion of the partition member has a groove open in its outer surface. The restrictor passage is defined such that the opening of the groove is closed by the inner surface of the second support member. While this arrangement simplifies the overall construction of the elastic mount, the arrangement suffers from operational drawbacks. Namely, if the partition member is formed of an elastic material having a relatively small modulus of elasticity so that the partition member is sufficiently deformable to provide an excellent vibration-isolating effect, the restrictor passage tends to have a considerably large variation or change in the cross sectional area, which causes an undesirable change in the frequency range of the vibrations that can be damped based on resonance of the fluid mass in the restrictor passage. If the partition member is formed of an elastic material having a relatively large modulus of elasticity to permit the restrictor passage to provide an excellent vibration-damping effect, on the other hand, the amount of deformation of the partition member is limited, and the vibration-isolating effect of the partition member is accordingly lowered.

SUMMARY OF THE INVENTION

It is accordingly an object of the present invention to provide a fluid-filled elastic mount which is simple in construction and easy to manufacture and which is highly capable of damping low-frequency large-amplitude vibrations and isolating high-frequency small-amplitude vibrations.

The above object may be attained according to the principle of the present invention, which provides a fluid-filled elastic mount including (a) a first and a second support member which are spaced apart from each other, (b) an elastic body disposed between the first and second support members for elastically connecting these support members, (c) a closure member supported by the second support member and cooperating with the second support member and the elastic body to define a fluid chamber which is filled with a non-compressible fluid, the closure member including a flexible portion, (d) a partition member supported by the second support member and dividing the fluid chamber into a pressure-receiving chamber on the side of the elastic body and an equilibrium chamber on the side of the closure member, and (e) means for defining a restrictor passage for restricted fluid communication between the pressure-receiving and equilibrium chambers, wherein the improvement comprises: the partition member consisting of an integrally formed member which has a thick-walled outer portion and a thin-walled inner portion inside the outer portion, the outer portion having a circumferential groove and being held in pressed contact with the second support member such that the groove is closed so as to define the restrictor passage; the thin-walled inner portion including a double-layered structure consisting of a first layer formed of a first elastic material, and a second layer formed of a second elastic material which has a larger modulus of elasticity deformable than the first elastic material, to increase rigidity of the partition member, the double-layered structure being elastically due to a difference between pressures in the pressure-receiving and equilibrium chambers.

The fluid-filled elastic mount of the present invention constructed as described above is capable of effectively damping input vibrations having relatively low frequencies and relatively large amplitudes, based on restricted flows of the non-compressible fluid through the restrictor passage, and is at the same time capable of effectively isolating relatively high-frequency small-amplitude input vibrations, based on deformation of the double-layered structure of the partition member. In this respect, the instant fluid-filled elastic mount has damping and isolating functions as provided on the conventional fluid-filled elastic mount. Since the partition member may be an integrally formed elastic structure which consists of the first and second elastic materials, the partition member may be produced and assembled into the elastic mount, with more ease, than a partition device used in the conventional elastic mount, which is a comparatively complicated metallic assembly. Therefore, the unitary partition member used according to the present invention significantly contributes to reduction in the overall cost of manufacture of the instant elastic mount.

Further, in the instant fluid-filled elastic mount according to the present invention, the thick-walled outer portion of the partition member secured to the second support member is formed of the second elastic material having a comparatively large modulus of elasticity. In other words, the thick-walled outer portion is sufficiently rigid or stiff, and is therefore less likely to undergo a variation in the cross sectional area of the restrictor passage, even if the passage is formed through the thick-walled outer portion. On the other hand, the double-layered structure of the thin-walled inner portion which is adapted to be deformed due to a pressure difference between the pressure-receiving and equilibrium chambers consists of the first layer formed of the first elastic material having a relatively small elasticity modulus, and the second layer formed of the second elastic material having a relatively large elasticity modulus. The first layer renders the double-layered structure sufficiently soft or elastic so that the double-layered structure of the thin-walled inner portion of the partition member is elastically deformable in an adequate manner due to the pressure difference which arises between the pressure-receiving chamber and the equilibrium chamber. Accordingly, the restrictor passage formed through the thick-walled outer portion of the partition member provides a sufficiently stable damping effect for input vibrations of an intended frequency range, based on resonance of a mass of the non-compressible fluid in the restrictor passage, while the thin-walled inner portion of the partition member including the double-layered structure indicated above provides an excellent vibration isolating effect based on deformation of the double-layered structure.

Furthermore, the double-layered structure of the thin-walled inner portion facilitates an adjustment of the overall elasticity of the portion of the partition member which is designed to be deformed for isolating the vibrations, since the desired overall elasticity may be established by adjusting the thickness of the second layer of the double-layered structure. If the inner portion of the partition member consists of a single elastic layer, the adjustment of the elasticity is comparatively difficult.

According to the present invention, the thick-walled outer portion of the partition member which is secured to the second support member may be formed of the second elastic material having a relatively large modulus of elasticity.

In one form of the elastic mount of the invention, the first layer of the double-layered structure of the partition member consists of an inner layer of the double-layered structure which partially defines the pressure-receiving chamber.

In an alternative form of the invention, the first layer of the double-layered structure of the partition member consists of an outer layer of the double-layered structure which partially defines the equilibrium chamber.

In a further form of the elastic mount of the invention, the first elastic material comprises a non-reinforced rubber material which does not contain reinforcing short fibers, while the second elastic material comprises a reinforced rubber material which contains reinforcing short fibers.

In a still further form of the invention, an entirety of the thin-walled inner portion of the partition member consists of the double-layered structure. The thin-walled inner portion of the partition member may include an annular thin-walled part which has a smaller wall thickness than a remainder thereof. In this case, only the annular thin-walled portion may constitutes the double-layered structure. In the case where the thin-walled inner portion further includes an extreme outer section outside the annular thin-walled part, the annular thin-walled part and the extreme outer section may constitute the double-layered structure.

BRIEF DESCRIPTION OF THE DRAWINGS

The above and optional objects, features and advantages of the invention will become more apparent by reading the following detailed description of presently preferred embodiments of the invention, when considered in conjunction with the accompanying drawings, in which.

DETAILED DESCRIPTION OF THE PREFERRED EMBODIMENTS

Figure 1:
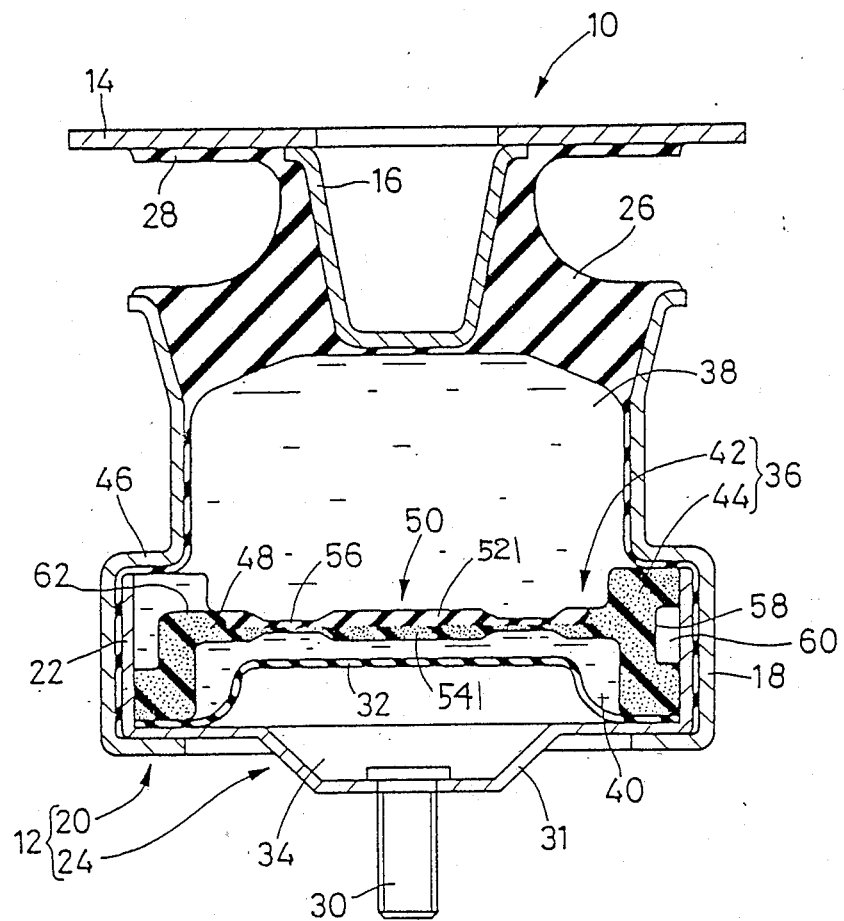
FIG. 1 is an elevational view in vertical cross section of one embodiment of a fluid-filled elastic mount in the form of an engine mount for an automotive vehicle.

Referring first to FIG. 1, there is shown a fluid-filled elastic mount in the form of an engine mount for mounting an engine on a motor vehicle. In the FIGURE, reference numerals 10, 12 designate a first and a second support member in the form of a first and a second metal member. These first and second metal members 10, 12 are spaced apart from each other by a suitable distance in a direction (top-bottom direction as seen in the plane of the figure) in which a vibrational load is applied to the engine mount. This direction will be referred to as "load-receiving direction" when appropriate.

The first metal member 10 consists of an annular plate 14, and a pot-shaped member 16 which has a tapered circumferential wall. The pot-shaped member 16 is secured, at the open end of its tapered circumferential wall, to an inner peripheral portion of the annular plate 14 which defines an central hole formed therein. As shown in FIG. 1, the first metal member 10 is positioned such that the pot-shaped member 16 extends toward the second metal member 12.

On the other hand, the second metal member 12 consists of a generally cylindrical calking member 20, and a bottom member 24 fixed to the calking member 20 so as to define a vessel structure which is closed at its bottom and open at its open end. More specifically, the calking member 20 has a large-diameter calking portion 18 at its one axial end adjacent to the bottom member 24, while the bottom member 24 has a cylindrical wall 22 to which the portion 18 is calked. The vessel structure thus defined by the second metal member 12 is disposed coaxially with the first metal member 10, such that the vessel structure (second metal member 12) is open at its other axial end on the side of the first metal member 10.

The first and second metal members 10, 12 are elastically connected to each other by an elastic body 26 which is formed by means of vulcanization within a suitably prepared mold, such that the elastic body 26 is secured to the outer surface of the pot-shaped member 16 of the first metal member 10 and to the inner surface of the open end portion of the second metal member 12, so as to fluid-tightly close the opening of the second metal member 12. The instant engine mount is attached at its first metal member 10 to either the engine of the vehicle or the vehicle body, and at its second metal member 12 to the other of the vehicle engine and the vehicle body, so that the engine or a power unit including the engine is mounted on the vehicle in a vibration damping and isolating manner.

As is apparent from FIG. 1, the annular plate 14 of the first metal member 10 is spaced away from the open end of the second metal member 12, by a predetermined distance in the load-receiving direction when the instant engine mount is mounted on the vehicle. The inner surface of the annular plate 14 which faces the open end of the second metal member 12 is covered by a damping rubber layer 28 formed integrally with the elastic body 26. The plate 14 and the open end of the second metal member 12 are adapted to abut on each other, to thereby prevent an excessive amount of relative displacement of the first and second metal members 10, 12 toward each other. In this event, the rubber layer 28 serves to reduce an abutting impact between the two metal members 10, 12.

Reference numeral 30 in FIG. 1 denotes a mounting bolt secured to a bottom wall 31 of the bottom member 24 of the second metal member 12, for attaching the engine mount to the vehicle engine or body.

The calking member 20 and the bottom member 24 of the second metal member 12 are fluid-tightly secured to each other by calking of the calking member 20 against the bottom member 24. At the same time, a closure member in the form of a flexible diaphragm 32 is fluid-tightly secured, at its outer peripheral portion, to the inner surface of the second metal member 12. Thus, the flexible diaphragm 32 cooperates with the second metal member 12 and the elastic body 26 to define a fluid-tight enclosed space or fluid chamber, which is filled with a suitable non-compressible fluid such as water, polyalkylene glycol and silicone oil. An air chamber 34 is defined between the diaphragm 32 and the bottom member 24 of the second metal member 12, so that the air chamber 34 permits the diaphragm 32 to be deformed or displaced.

Like the diaphragm 32, an elastic partition member 36 is fluid-tightly secured, at its outer periphery, to the inner surface of the second metal member 12, at the time when the calking member 20 is calked against the bottom member 24. The partition member 36 is disposed inside the diaphragm 32, such that the enclosed space or fluid chamber indicated above is divided by the partition member 36 into a pressure-receiving chamber 38 formed on the side of the elastic body 26, and an equilibrium chamber 40 formed on the side of the diaphragm 32.

Figure 2:
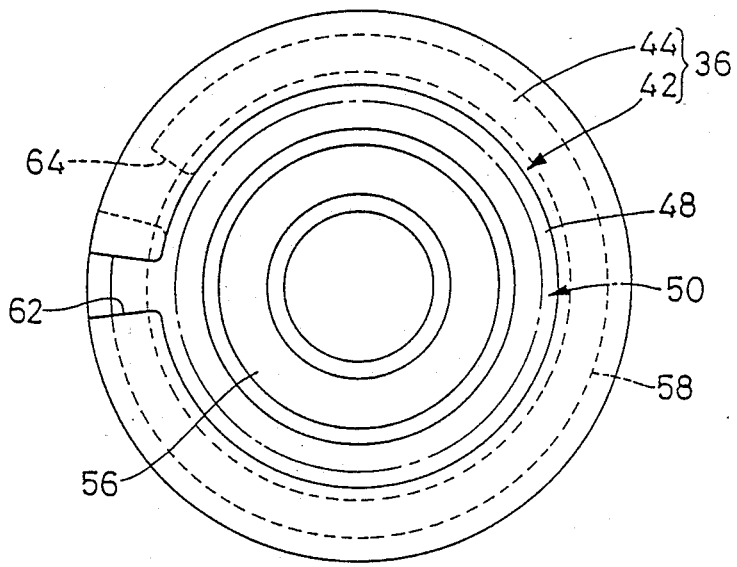
FIG. 2 is a plan view showing a partition member used in the engine mount of FIG. 1.

Described in greater detail referring also to FIG. 2, the partition member 36 consists of a generally planar, thin-walled inner portion 42 and an annular, thick-walled outer portion 44 formed integrally with and outside of the inner portion 42. As shown in FIG. 1, the partition member 36 is fluid-tightly secured to the second metal member 12, such that the thick-walled outer portion 44 is squeezed in the load-receiving direction, while being held between and in pressed contact with a shoulder section 46 of the calking portion 18 of the calking member 20 and the bottom wall 31 of the bottom member 24, when the calking member 20 is calked against the bottom member 24. It will be seen from FIG. 1 that the outer peripheral portion of the closure member or flexible diaphragm 32 is held in pressed contact with the thick-walled outer portion 44 of the partition member 36 and the bottom wall 31 of the bottom member 24 of the second metal member 12.

As depicted in FIG. 1, the thick-walled outer portion 44 and an outer peripheral section 48 of the thin-walled inner portion 42 of the partition member 36 are a single-layered structure of an elastic material, while an inner disc section 50 of the thin-walled inner portion 42 which is inside of the outer peripheral section 48 is a double-layered structure. This double-layered structure consists of an inner, first layer 52 formed of a first elastic material, and an outer, second layer 54 formed of a second elastic material which has a larger modulus of elasticity than the first elastic material. The single-layered structure of the thick-walled outer portion 44 and the outer peripheral section 48 of the inner portion 42 is formed of the second elastic material. The inner first layer 52 is formed on the side of the pressure-receiving chamber 38, while the outer second layer 54 is formed on the side of the flexible diaphragm 32. In the presence of the double-layered structure, the inner disk section 50 of the thin-walled inner portion 42 is comparatively soft, while the remainder of the partition member 36 is comparatively stiff or rigid. According to this arrangement, the inner disc section 50 of the generally planar thin-walled inner portion 42 of the partition member 36 is comparatively easily deformable in the load-receiving direction so as to absorb or accommodate a pressure difference between the pressure-receiving and equilibrium chambers 38, 40, while the remainder of the partition member 36 is kept substantially undeformed, when a vibrational load is applied to the instant engine mount.

In the instant engine mount wherein the partition member 36 is constructed as described above, the thick-walled outer portion 44 of the partition member 36 which is held in pressed contact with the second metal member 12 has a considerably increased degree of rigidity for a restricted amount of deformation, while on the other hand the inner disc section 50 of the thin-walled inner portion 42 has a comparatively reduced degree of rigidity or stiffness so that the inner disc section 50 is relatively easily deformable or elastically yieldable in response to a pressure difference between the pressure-receiving chamber 38 and the equilibrium chamber 40, which occurs when vibrations are applied to the instant engine mount. Due to this deformation of the inner disc section 50 of the thin-walled inner portion 42 of the partition member 36, the vibrations having relatively high frequencies within a predetermined range may be effectively isolated.

In other words, the inner disc section 50 of the inner portion 42 of the partition member 36 is tuned to about 200 Hz so that the vibrations having frequencies in the neighborhood of 200 Hz can be effectively isolated by the oscillatory deformation of the inner disc section 50.

The inner disc section 50 of the thin-walled inner portion 42 of the partition member 36 includes an annular thin-walled part 56 which is located inwardly of the outer peripheral portion 48 (part of the single-layered structure as described above) and which encircles a central section of the inner portion 42, as indicated in FIGS. 1 and 2. The thin-walled part, 56 has a smaller thickness than the remainder of the thin-walled portion 50 and is deformable most easily and to a considerably large extent, when a pressure difference arises between the pressure-receiving and equilibrium chambers 38, 40. The thin-walled part 56 is deformed in a direction to accommodate the pressure difference.

Described more particularly, upon occurrence of a pressure difference between the two chambers 38, 40 due to application of a vibrational load, the thin-walled part 56 of the partition member 36 is first deformed to a certain extent, before the remainder of the thin-walled inner portion 42 is deformed. In the present specific embodiment, the thin-walled part 56 is tuned to a vibration frequency range of about 100–150 Hz lower than the frequency range (in the neighborhood of 200 Hz) to which the entire inner disc section 50 is tuned. Accordingly, the vibrations having frequencies in the neighborhood of 100–150 Hz can be effectively isolated based on the oscillatory deformation of the thin-walled part 56 of the inner thin-walled portion 50.

The first elastic material used for the first layer 52 of the double-layered section of the partition member 36 preferably consists of a non-reinforced rubber material which does not contain any reinforcing fibers such as short fibers, or a thermosetting elastomer which has a small modulus of elasticity. On the other hand, the second elastic material used for the remainder of the partition member 36 preferably consists of a reinforced rubber material which contains reinforcing short fibers such as 6, 6-nylon evenly mixed therein, or a thermosetting elastomer which has a comparatively large modulus of elasticity. The partition member 36 is prepared with the first and second layers 52, 54 integrally formed. For example, the unvulcanized first elastic material for the first layer 52 on the side of the pressure-receiving chamber 38 is set in a suitable mold while the unvulcanized second elastic material for the second layer 54 and the remainder of the partition member 36 is injected into the mold.

The thick-walled outer portion 44 of the thus constructed partition member 36 has a circumferential groove 58 formed in the outer circumferential surface over substantially the entire circumference, as shown in FIGS. 1 and 2. With the partition member 36 secured to the second metal member 12, the circumferential groove 58 is closed by the cylindrical wall 22 of the bottom member 24, whereby the groove 58 and the cylindrical wall 22 define a restricted passage 60 for restricted fluid communication between the pressure-receiving and equilibrium chambers 38, 40.

The restricted passage 60 is provided to permit the non-compressible fluid to flow between the pressure-receiving and equilibrium chambers 38, 40 upon occurrence of a pressure difference between these two chambers. Based on resonance of a mass of the fluid in the restricted passage 60, vibrations having frequencies within a predetermined range are effectively damped. The frequency range of the vibrations damped by the restricted passage 60 is determined by the dimensions and configuration of the passage 60 (circumferential groove 58).

Namely, the restricted passage 60 is tuned to a relatively low frequency so that the vibrations having frequencies of about 10–15 Hz can be damped in an effective manner, due to resonance of the fluid mass in the restricted passage 60, when a vibrational load is applied to the instant engine mount.

The restricted passage 60 communicates with the pressure-receiving chamber 38 through a cutout 62 formed in the thick-walled outer portion 44 of the partition member 36, and communicates with the equilibrium chamber 40 through a communication hole 64 formed also in the thick-walled outer portion 44, as indicated in FIGS. 1 and 2.

It follows from the above description that the thus constructed engine mount is capable of effectively not only damping the vibrations in a relatively low frequency range in the neighborhood of about 10-15 Hz based on the resonance of the fluid mass in the restricted passage 60, but also isolating the vibrations in a relatively high frequency range in the neighborhood of about 100-150 Hz based on the deformation of the thin-walled part 56 of the inner disc section 50 of the generally planar thin-walled inner portion 42 of the partition member 36. Thus, the instant engine mount is capable of damping or isolating both the relatively low-frequency large-amplitude vibrations and the relatively high-frequency small-amplitude vibrations, like the conventional fluid-filled elastic engine mount which incorporates a movable member which is oscillated due to a changing pressure difference between two fluid chambers. Further, the instant engine mount is capable of effectively isolating the vibrations in a higher frequency range in the neighborhood of 200 Hz, based on the deformation of the inner disc section 50 of the partion member 36 as a whole. Therefore, the frequency range of the vibrations that can be properly damped by the instant engine mount is widened as compared with that of the conventional fluid-filled engine mount. That is, the vibration damping capability of the instant engine mount is accordingly enhanced.

Furthermore, the partition member 36 for dividing the enclosed space into the pressure-receiving and equilibrium chambers 38, 40 is easy to manufacture or assemble, since the partition member 36 is constituted by an integrally formed elastic member which consists of the first and second rubber materials. Consequently, the production efficiency of the instant engine mount is significantly improved.

The partition member 36 of the instant engine mount is further advantageous owing to the double-layered structure of the inner disc section 50 of the thin-walled inner portion 42, and the single-layered structure of the thick-walled outer portion 44. Namely, the double-layered inner disc section 50 is relatively easily deformed while the deformation of the single-layered outer portion 44 secured to the second metal member 12 is restricted. Accordingly, the inner disc section 50 of the generally planar thin-walled inner portion 42 of the partition member 36 can be deformed by a relatively large amount while a variation in the cross sectional area of the restricted passage 60 (groove 58) is kept to a minimum. This enables the restricted passage 60 to provide a sufficiently stable damping effect with respect to the input vibrations of a relatively low frequency range (about 10–15 Hz) based on the resonance of the fluid mass in the passage 60, and at the same time enables the partition member 36 to provide a sufficiently effective isolating function with respect to the vibrations of a relatively high frequency range (about 100–150 Hz, and in the neighborhood of 200 Hz) based on the deformation of the partition member 36.

In addition, the thick-walled outer portion 44 of the partition member 36 has a wall thickness equal to the length of the cylindrical wall 22 of the bottom member 24 of the second metal member 12, so that the thick-walled outer portion 44 is protected from a vibrational load. This arrangement also contributes to avoiding a change in the cross sectional area of the restricted passage 60 upon application of a vibrational load to the engine mount. For the same reason, the thick-walled outer portion 44 of the partition member 36 is protected from dulling and the resulting reduction in the sealing capability at the periphery.

Moreover, the double-layered structure of the inner disc section 50 of the thin-walled inner portion 42 of the partition member 36 makes it possible to more easily establish the ease of deformation of the inner disc section 50 as a whole and the ease of deformation of the thin-walled part 56, by adjusting the thickness of the second layer 54 formed of the second elastic material whose modulus of elasticity is larger than the first elastic material of the first layer 52, so that the inner disc section 50 and the thin-walled part 56 ma be deformed by amounts corresponding to the amplitudes of the vibrations that are intended to be isolated by the partition member 36.

Figure 3:
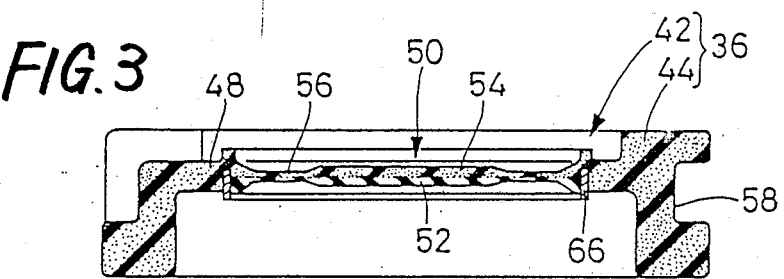
FIGS. 3 and 4 are elevational views in cross section, showing other embodiments of the invention.

While the present invention has been described in its presently preferred embodiment, it is to be understood that the invention is not limited to the details of the illustrated embodiment, but may be otherwise embodied While the partition member 36 is entirely formed of elastic materials, the partition member 36 may incorporate a rigid ring 66 embedded therein such that the rigid ring 66 defines the outer periphery of the first layer 52 on the side of the equilibrium chamber 40, as illustrated in FIG. 3. The rigid ring 66 prevents the inner disc section 50 of the double-layered thin-walled inner portion 42 from creasing due to compression of the thick-walled outer portion 44 between the shoulder section 46 and the bottom wall 31 of the second metal member 12. Since the rigid ring 66 is extremely easy to manufacture, the use of the ring 66 will not significantly reduce the ease of manufacture of the partition member 36. The inner disc section 50 is deformed or displaced primarily due to the deformation of the thin-walled part 56. Further, unlike the first layer 52 of the double-layered inner disc section 52 of the partition member 36 of FIGS. 1 and 2, the first layer 52 of the inner disc section 50 of the present embodiment is disposed on the side of the equilibrium chamber 40.

Figure 4:
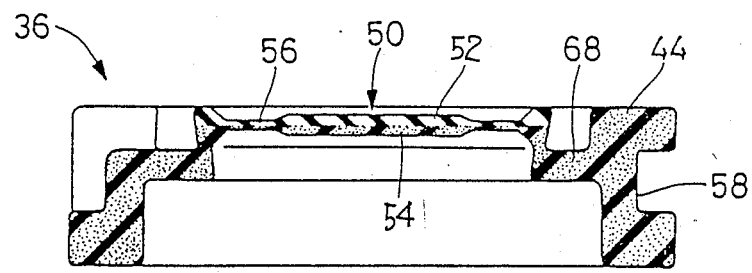

Although the partition member 36 in the embodiments of FIGS. 1–2 and 3 consists of the generally planar, thin-walled inner portion 42 and the thick-walled outer portion 44, there may be provided a stepped portion between the inner and outer portions 42, 44, as indicated at 68 in FIG. 4. The stepped portion 68 is L-shaped in cross section, having an inner cylindrical part to which is secured the thin-walled part 56 of the double-layered inner disc section 50 of the thin-walled inner portion 42. The stepped portion 68 is formed of the second elastic material of which the second layer 54 of the double-layered section 50 is formed. In the present embodiment, too, the inner disc section 50 of the thin-walled inner portion 42 is deformed primarily due to the deformation of the thin-walled part 56.

While in the illustrated embodiments the entirety of the inner disc section 50 of the thin-walled inner portion of the partition member 36 constitutes a double-layered structure, only the thin-walled part 56 of the inner disc section 50 may be double-layered in the embodiments of FIGS. 3 and 4, or only the thin-walled part 56 and the outer peripheral section 48 outside of the part 56 may constitute a double-layered structure. In these cases, the central part of the thin-walled inner portion 42 is a single-layered structure formed of the second elastic material, while the remaining annular outer part which encircles the single-layered central part is a double-layered structure consisting of the first and second layers 52, 54 which are formed of the first and second elastic materials, respectively.

In the illustrated embodiments, the circumferential groove 58 providing the restrictor passage 60 is formed such that the groove 58 is open in the outer circumferential surface of the thick-walled outer portion 44 of the partition member 36, the groove 58 may be replaced by a hole formed in the thick-walled outer portion 44 such that the hole is open in the axial end faces of the outer portion 44.

While the illustrated embodiments of the present invention are adapted to be used as an engine mount for a motor vehicle, the fluid-filled elastic mount according to the invention may find other applications.

It is to be understood that the present invention may be embodied with various other changes, modifications and improvements, which may occur to those skilled in the art, without departing from the spirit and scope of the invention defined in the following claims.

What is claimed is:

1. A fluid-filled elastic mount including (a) a first and a second support member which are spaced apart from each other, (b) an elastic body disposed between the first and second support members for elastically connecting these support members, (c) a closure member supported by said second support member and cooperating with the second support member and the elastic body to define a fluid chamber which is filled with a non-compressible fluid, the closure member including a flexible portion, (d) a partition member supported by the second support member and dividing said fluid chamber into a pressure-receiving chamber on the side of said elastic body and an equilibrium chamber on the side of said closure member, and (e) means for defining a restrictor passage for restricted fluid communication between said pressure-receiving and equilibrium chambers, said fluid-filled elastic mount comprising:

said partition member including an integrally formed member which has a thick-walled outer portion and a thin-walled inner portion inside said outer portion, said outer portion having a circumferential groove and being held in pressed contact with said second support member such that said groove is closed so as to define said restrictor passage;

said thin-walled inner portion including a double-layered structure defined by a first layer formed of a first elastic material, and a second layer formed of a second elastic material which has a larger modulus of elasticity than said first elastic material, to adjust elasticity of said thin-wall inner portion and increase rigidity of said thin-walled inner portion, said first and second layers being in direct axial engagement with each other and elastically deformable together with each other due to a difference between pressures in said pressure-receiving and equilibrium chambers.

2. A fluid-filled elastic mount according to claim 1, wherein said first layer of said double-layered structure of the partition member consists of an inner layer of said double-layered structure which partially defines said pressure-receiving chamber.

3. A fluid-filled elastic mount according to claim 1, wherein said first layer of said double-layered structure of the partition member consists of an outer layer of said double-layered structure which partially defines said equilibrium chamber.

4. A fluid-filled elastic mount according to claim 1, wherein said first elastic material comprises a non-reinforced rubber material which does not contain reinforcing short fibers, while said second elastic material comprises a reinforced rubber material which contains reinforcing short fibers.

5. A fluid-filled elastic mount according to claim 1, wherein an entirety of said thin-walled inner portion of said partition member consists of said double-layered structure.

6. A fluid-filled elastic mount according to claim 1, wherein said thin-walled inner portion of said partition member includes an annular thin-walled part which has a smaller wall thickness than a remainder thereof, said annular thin-walled port constituting said double-layered structure.

7. A fluid-filled elastic mount according to claim 1, wherein said thin-walled inner portion of said partition member includes an annular thin-walled part which has a smaller wall thickness than a remainder thereof, and an extreme outer section outside said annular thin-walled part, said annular thin-walled part and said extreme outer section constituting said double-layered structure.

8. A fluid-filled elastic mount according to claim 1, wherein said partition member is constructed substantially without metal.

9. A fluid-filled elastic mount according to claim 1, wherein one of said first and second support members is connected to a vehicle engine.

* * * * *